DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JANUARY 6, 1976

942 O.G. 191

T942,010

NOVEL CURES FOR BLOCKED POLYSULFIDE POLYMERS

Julian R. Panek, Newtown, Pa., and Michael J. Kohut, Trenton, N.J., assignors to Thiokol Chemical Corporation, Bristol, Pa.

Continuation of application Ser. No. 403,576, Oct. 4, 1973, which is a continuation of application Ser. No. 255,349, May 22, 1972, both now abandoned. This application Feb. 12, 1975, Ser. No. 549,256

Int. Cl. B05d *3/10*

U.S. Cl. 427—340

No Drawing. 17 Pages Specification

A process for providing a curing system for aldehyde and ketone blocked polysulfide polymers is disclosed wherein ammonium compounds and substituted amines are used to cure the blocked polysulfide polymers after impregnation of leather by the blocked polysulfide polymer.